[11] 3,589,793

[72] Inventor Lawrence E. Curtiss
 Ann Arbor, Mich.
[21] Appl. No. 657,325
[22] Filed May 6, 1957
[45] Patented June 29, 1971
[73] Assignees Basil I. Hirschowitz;
 Wilbur Peters
 both of Ann Arbor, Mich., part interest to each

[54] GLASS FIBER OPTICAL DEVICES
 8 Claims, 5 Drawing Figs.
[52] U.S. Cl. .................................................. 350/96 B,
  65/3, 65/DIG. 7
[51] Int. Cl. ................................................ G02b 5/16
[50] Field of Search ............................................ 88/1;
  350/96

[56] References Cited
 UNITED STATES PATENTS
 1,848,814  3/1932  Allen ........................... 88/1 LCR
 2,269,459  1/1942  Kleist ............................ 49/77 D
 2,313,296  3/1943  Lamesch ...................... 28/82
 2,569,700  10/1951 Stalego ......................... 49/77 D
 2,674,025  4/1954  Ladisch ........................ 28/82
 2,825,260  4/1958  O'Brien ........................ 88/1 LCR OTHER REFERENCES
Van Heel, "A New Method of Transporting Optical Images Without Aberrations," NATURE, Vol. 173, No. 4392, Jan. 1954 pages 39— 41. Copy available in Scientific Library of the Patent Office 881/(LCR)

*Primary Examiner*—John K. Corbin
*Attorney*—W. Philip Churchill

ABSTRACT: A glass fiber for use in transmitting light from end-to-end thereof comprising a clear optical glass fiber core having a predetermined index of refraction and a continuous glass coating adapted to prevent light from escaping from the core into the coating, the coating being fused to the entire outer surface of the core from end-to-end thereof and having an index of refraction which is lower than that of the core. A plurality of these fibers made up in side-by-side ordered relation form a light or an image transmitting device. The glass coating on each core preferably has a higher softening temperature than that of the core. In addition, the fibers are extremely fine in size, such as up to about 0.0002 inch thick.

PATENTED JUN29 1971
3,589,793
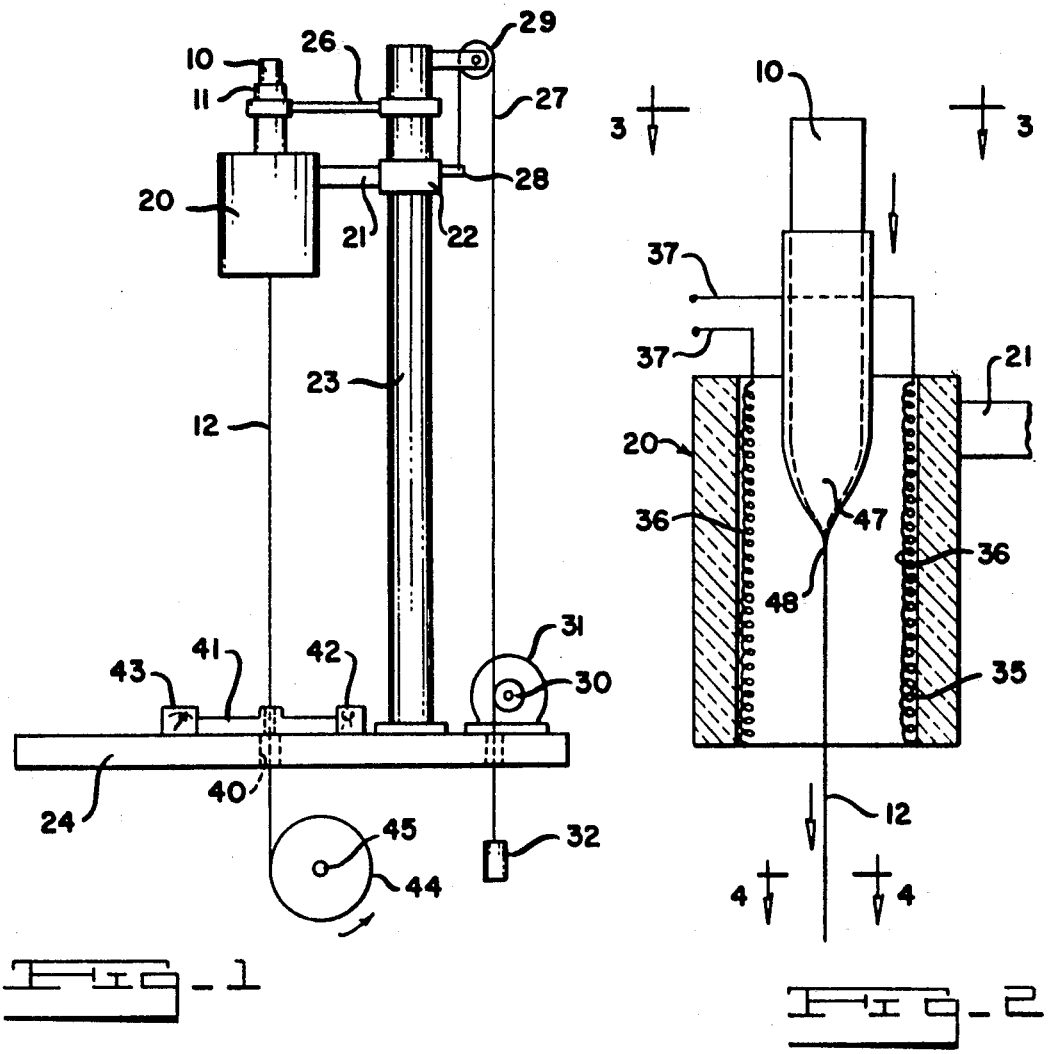
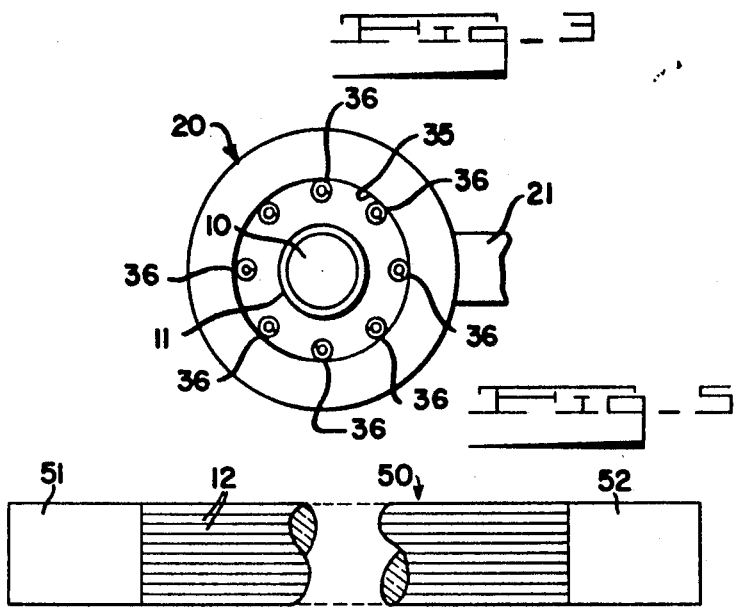
INVENTOR.
LAWRENCE E. CURTISS
BY
Cullen & Cantor
ATTORNEYS

GLASS FIBER OPTICAL DEVICES

This invention relates to optical glass fibers and more particularly to optical glass fibers of an extremely fine diameter and composed of a glass center of uniform diameter, coated by a continuous uniform coating of glass fused to the center.

A previous patent application filed by Basil I. Hirschowitz, Ser. No. 631,187, filed Dec. 28, 1956, now U.S. Pat. No. 3,010,357, issued Nov. 28, 1961, discloses a flexible light-transmitting tube which is formed of a bundle comprising a large number of fine glass fibers held together. These fine fibers each individually transmit light from one end to the other so that the tube, despite being bent or warped in almost any way can be used to view an object from one end to the other.

Such a light-transmitting bundle is made of glass fibers each somewhere in the order of one and one-half thousandths of an inch in diameter. Approximately 35,000 of these fibers make up a bundle of about three-eighths of an inch in diameter and of a length of about a yard or two.

The making of glass fibers for such a use as well as for other analogous uses, has previously been an extremely difficult problem because of the fineness of the fiber required and also because the glass must be coated on the outside to prevent loss of light. Where the fiber is first drawn and then coated, the double handling and double operation is extremely time consuming and expensive and results in a great deal of breakage. Likewise, it is extremely difficult and in fact, almost impossible, to obtain a completely continuous outer coating.

However, with the invention herein, it is contemplated to form an extremely fine glass fiber, such as one to two thousandths of an inch in diameter, wherein the diameter is uniform. This glass fiber consists of a glass center to which an outer glass coating is fused. The outer coating is of glass having a lower refractive index than the center. Thus, the outer coating acts like a light barrier to prevent the loss of light transmitted through the center.

Thus, it is an object of this invention to provide such a glass fiber which may be made inexpensively, accurately, and with almost complete elimination of breakage, the fiber and its outer coating being formed in one single operation and at high speed.

It is also an object of this invention to provide such glass fiber having a glass center to which is fused an outer glass coating, wherein the glass coating is continuous and is of a uniform thickness and with the entire fiber being of a uniform diameter.

These and further objects of this invention will become apparent upon reading the following description of which the attached drawings form a part:

With reference to the attached drawings,

FIG. 1 is an elevational view of the apparatus used for forming the glass fiber.

FIG. 2 is an enlarged cross-sectional view of the furnace and the glass fed into and coming out of the furnace.

FIG. 3 is a top view of the furnace taken in the direction of arrows 3-3 of FIG. 2.

FIG. 4 is a greatly enlarged cross-sectional view of the glass fiber taken in the direction of arrows 4-4 of FIG. 2.

FIG. 5 is an elevational view, partially broken away for convenience, of a light-transmitting tube made from glass fibers of the present invention.

With reference to the drawings, the starting material used consists of solid glass rod 10 inserted and closely fitted within a glass tube 11. This material is then converted into the fine diameter fiber 12.

With reference to FIG. 4, the final product, the fiber 12, is composed of a center 13 and a continuous uniform outer coating 14 with the center and the coating being fused together.

THE APPARATUS

The apparatus for carrying out the method herein, generally comprises a furnace 20 connected to an arm 21 which is secured to a bracket or clamp 22. The clamp is slidably mounted upon a support post 23 secured to a table 24.

The glass rod and tube 10 and 11, respectively, are supported by a clamp 26 which is clamped around the glass tube 11 and is tightly clamped to the support post 23 above the furnace 20.

The furnace is arranged to be slowly drawn upwards along the post in order to move the end of the rod and tube into the furnace. Thus, this slow movement is accomplished by means of a cable 27 connected at 28 to the clamp 22 and passing over a pulley 29 mounted upon the top of the support post 23. The cable is wound once around a pulley 30 which is motor driven by a continuous speed motor 31 and the end of the cable is attached to a counter weight 32. Thus, the slow movement of the pulley 30 causes the cable to draw the clamp 22 upwards at a slow constant rate of speed.

The furnace 20 is formed of a cylinder of some suitable material, and within the inside bore 35 there are mounted electrical coils 36 connected by wires 37 to a variable power source, such as a transformer connected to a conventional power line (not shown). These electrical coils are arranged to provide sufficient heat to melt the glass as it passes through the furnace center 35.

The apparatus also includes an opening 40 formed in the table 24 for the passage of the glass fiber 12 which also passes through a conventional measuring instrument 41 having a light source 42 shining on the glass fiber and a measuring meter 43 which determines the thickness of the fiber by measuring the light scattered by the fiber. The end of the fiber is wound around a spool 44 which is located beneath the table and which is mounted upon a shaft 45. The shaft 45 connected to a motor (not shown) which rotates the shaft and the spool.

THE METHOD

To form the glass fiber, the solid glass tube 10 is inserted into its sleeve or outer tube 11. The inner diameter of the tube is close to the outer diameter of the rod so that the rod fits closely within the tube. The combined rod and tube are then slowly fed downwards into the furnace, in this example, by moving the furnace upwards relative to the stationary rod.

The heating coils 36 within the furnace heat the lower end of the rod and tube at 47 as they are fed downwardly to a degree where the glass begins plastic flow. The glass plastically flows towards a point 48.

A handle in the form of a glass rod may then be inserted through the open bottom of the furnace to contact the point 48 and fuse to such point. Then the rod is removed to thus draw the glass at the point down in the form of fiber.

Thereafter, the handle is broken off and the fiber 12 is continuously drawn off the point 48. The fiber is passed through the table opening 40 and wound around the spool 44.

By feeding the rod and tube slowly into the furnace, the lower end is continuously heated and maintained at a constant temperature and by drawing off the fiber at a constant temperature and by drawing off the fiber at a continuous rate of speed a uniform diameter fiber is obtained. Likewise, the sleeve and the rod are fused together so that the fiber consists of a solid center core 13 with the fused outer coating 14. The center core is of uniform diameter as is the outer core 14 and the outer coating is a complete coating with no breaks and is of uniform thickness.

Since it is desired to form a glass fiber which will transmit light, it is desirable that the core or center be of a clear optical glass of high optical index such as in the order of 1.60 to 1.8. Likewise, the glass tube which forms the coating should be of a lower index such as 1.51 or less and should be clear glass, having a slightly higher melting point than the center glass. It is preferred that the outer glass tube have a higher melting point, such as approximately 40° to 50° C. higher than the melting point of the rod so that both flow uniformly towards the point 48.

The heat supplied by the furnace should be enough so that the glass plastically flows and pulls away from the point easily. A suitable temperature would be just where the glass is quite plastic, but does not run freely. The heat will vary for each particular type of glass and can be determined upon visual observation at the beginning of the process.

By way of example, a test rod of about three-quarters of an inch outer diameter was used with a tube having a wall thickness of about one-sixteenth of an inch and an inside diameter slightly larger than the rod diameter. The rod and tube were each of clear optical glass, with the index of refraction of the tube being less than that of the rod.

It is to be noted, that the relationship between the wall thickness of the tube to the diameter of the rod is equal to the relationship between the wall thickness of the fiber coating to the fiber center. Thus, in this case, a glass fiber of about one and one-half thousandths of an inch was obtained with a wall thickness of about 1.25 ten-thousandths of an inch which is somewhere in the order of about 10 wavelengths of light. It is desirable that the thickness of the outer coating 14 should be at least 4 or 5 wavelengths of light to reduce light loss as it is transmitted through the center of the fiber.

In order to achieve this fiber size, the fiber was drawn off the point of the rod and tube end 48 at the rate of about 20 miles per hour which was obtained by simply rotating the spool 44 at such a circumferential rate of speed. At the same time, the rod was fed into the furnace or rather the furnace was fed onto the rod at about 7 inches per hour.

Thus, it can be seen that the finished diameter of the fiber may be varied either by increasing or decreasing the speed at which the fiber is drawn off or increasing or decreasing the speed at which the glass rod and tube are fed into the furnace or both.

To draw off the glass fiber, extremely little pull or tension is required, for example, less than 40 grams of pull are required to draw off the fiber of the example material mentioned above. Actually, no separate pull is exerted, but rather the rotation of the spool 44 provides the necessary pull. Thus, at 20 miles per hour the spool provides a uniform pull to result in the fiber of the diameter given above.

The fiber formed is of uniform outer diameter, uniform center diameter, uniform coating which is also continuous, and the coating and the center are fused together into one solid mass, all of which is obtained in one simple handling operation. No dies or other equipment are required, the heat of the furnace being sufficient to fuse the rod and tube which are the starting materials and to permit the drawing off of the fiber. In FIG. 5 there is shown an optical light-transmitting bundle 50 which may be about three-eighths of an inch in diameter, about a yard or two in length, and may contain approximately 35,000 of the glass coated glass fibers 12. Each of the fibers extends the full length of the tube and are bound together at their ends 51 and 52. Between their ends, the fibers 12 are free of one another to provide the bundle 50 with extreme flexibility.

This invention may be further developed within the scope of the following attached claims. Accordingly, it is desired that the foregoing description be read as being merely illustrative of an operative embodiment of this invention and not in a strictly limiting sense.

I now claim:

1. A flexible optical light-transmitting glass fiber for use in forming a flexible image-transmitting device made up of a plurality of such fibers in side-by-side relation, comprising an elongated optically clear glass fiber core formed of glass of a predetermined index of refraction and being of substantially uniform cross section from end-to-end thereof, said glass having a glass coating of substantially uniform thickness fused to its entire outer surface, said glass coating having an index of refraction which is lower than that of said glass core and being adapted to prevent light from escaping from said core into said coating, said core and coating together having a thickness of up to about 0.002 inch.

2. A flexible optical light-transmitting glass fiber for use in forming a flexible image-transmitting device made up of a plurality of such fibers in side-by-side relation, comprising an elongated optically clear glass fiber core having a predetermined index of refraction and of substantially uniform diameter from end-to-end, said core having a glass coating of substantially uniform thickness fused to its surface from end-to-end thereof, said coating having an index of refraction which is lower than that of said glass core, said coating having a thickness greater than about four times the wavelength of visible light and being adapted to prevent light from escaping from said core into said coating, and said core and coating together having a diameter of about 0.0015 inch.

3. An optical light-transmitting device, comprising a large number of very thin solid glass fibers, said fibers each having an elongated optically clear light-conducting core formed of glass of a predetermined index of refraction and being of substantially uniform cross section from end-to-end thereof, each of said cores having a glass coating of substantially uniform thickness fused to its entire outer surface, said glass coatings having an index of refraction which is lower than that of said glass cores and being adapted to prevent light from escaping from said cores into said coatings, each of said cores together with its coating having a thickness of up to about 0.002 inch.

4. An optical light-transmitting device, comprising a large number of very thin solid glass fibers, said fibers each having an elongated optically clear light-conducting core formed of glass of a predetermined index of refraction and being of substantially uniform cross section from end-to-end thereof, each of said cores having a glass coating of substantially uniform thickness fused to its entire outer surface, said glass coatings having a higher softening temperature than that of said glass cores, having an index of refraction which is lower than that of said glass cores and being adapted to prevent light from escaping from said cores into said coatings, each of said cores together with its coating having a thickness of up to about 0.002 inch.

5. A flexible optical light-transmitting glass fiber for use in forming a flexible image-transmitting device made up of a plurality of such fibers in side-by-side relation, comprising an elongated optically clear glass fiber core formed of glass of a predetermined index of refraction and being of substantially uniform cross section from end-to-end thereof, said glass core having a glass coating of substantially uniform thickness fused to its entire outer surface, said glass coating having a higher softening temperature than that of said glass core, having an index of refraction which is lower than that of said glass core and being adapted to prevent light from escaping from said core into said coating, said core and coating together having a thickness of up to about 0.002 inch.

6. A flexible optical light-transmitting glass fiber for use in forming a flexible image-transmitting device made up of a plurality of such fibers in side-by-side relation, comprising an elongated optically clear glass fiber core formed of glass of a predetermined index of refraction and being of substantially uniform cross section from end-to-end thereof, said glass core having a relatively thin glass coating of substantially uniform thickness fused to its entire outer surface, said glass coating having an index of refraction which is lower than that of said glass core and being adapted to prevent light from escaping from said core into said coating, said core having a thickness of up to about 0.002 inch.

7. An optical light-transmitting device, comprising a large number of very thin solid glass fibers, said fibers each having an elongated optically clear light-conducting core formed of glass of a predetermined index of refraction and being of substantially uniform cross section from end-to-end thereof, each of said cores having a relatively thin glass coating of substantially uniform thickness fused to its entire outer surface, said glass coatings having an index of refraction which is lower than that of said cores and being adapted to prevent light from escaping from said cores into said coatings, each of said cores having a thickness of up to about 0.002 inch.

8. An optical light-transmitting glass fiber for use in forming a light-transmitting device made up of a plurality of such fibers in side-by-side relation, comprising an elongated optically clear glass fiber core formed of glass of a predetermined index of refraction and being of substantially uniform cross-sectional shape from end-to-end thereof, said glass core having a glass coating fused uniformly to its entire outer surface and having an index of refraction which is lower than that of said glass core and being adapted to prevent light from escaping from said core into said coating, said core having a thickness of up to about 0.002 inch.

UNITED STATES PATENT OFFICE
CERTIFICATE OF CORRECTION

Patent No. 3,589,793             Dated  June 29, 1971

Inventor(s)    Lawrence E. Curtiss

It is certified that error appears in the above-identified patent and that said Letters Patent are hereby corrected as shown below:

In the last line of the Abstract "0.0002" should be
-- 0.002 -- .

Signed and sealed this 16th day of May 1972.

(SEAL)
Attest:

EDWARD M. FLETCHER, JR.              ROBERT GOTTSCHALK
Attesting Officer                    Commissioner of Patents